(12) United States Patent
Hero et al.

(10) Patent No.: US 11,629,723 B2
(45) Date of Patent: Apr. 18, 2023

(54) SIDE CHANNEL COMPRESSOR FOR A FUEL CELL SYSTEM FOR CONVEYING AND/OR COMPRESSING A GASEOUS MEDIUM

(71) Applicant: Robert Bosch GmbH, Stuttgart (DE)

(72) Inventors: Alexander Hero, Lehrensteinsfeld (DE); Armin Merz, Weinstadt (DE)

(73) Assignee: Robert Bosch GmbH, Stuttgart (DE)

( * ) Notice: Subject to any disclaimer, the term of this patent is extended or adjusted under 35 U.S.C. 154(b) by 309 days.

(21) Appl. No.: 17/042,387

(22) PCT Filed: Jan. 30, 2019

(86) PCT No.: PCT/EP2019/052193
§ 371 (c)(1),
(2) Date: Sep. 28, 2020

(87) PCT Pub. No.: WO2019/185216
PCT Pub. Date: Oct. 3, 2019

(65) Prior Publication Data
US 2021/0140438 A1    May 13, 2021

(30) Foreign Application Priority Data
Mar. 28, 2018   (DE) .................... 10 2018 204 713.8

(51) Int. Cl.
*F04D 23/00*   (2006.01)
*F04D 29/18*   (2006.01)
(Continued)

(52) U.S. Cl.
CPC ....... *F04D 23/008* (2013.01); *F04D 25/0653* (2013.01); *F04D 27/00* (2013.01);
(Continued)

(58) Field of Classification Search
CPC .. F04D 23/008; F04D 25/0653; F04D 29/284; F04D 27/00; F04D 29/08; F04D 29/18; F04D 29/26
See application file for complete search history.

(56) References Cited

U.S. PATENT DOCUMENTS 3,844,674 A * 10/1974 Moriyama ............ F04D 23/008
415/55.1
5,310,308 A * 5/1994 Yu ......................... F04D 29/188
415/55.2
(Continued)

FOREIGN PATENT DOCUMENTS

CN         1383475 A    12/2002
CN       101165335 A     4/2008
(Continued)

OTHER PUBLICATIONS

International Search Report for Application No. PCT/EP2019/052193 dated Apr. 3, 2019 (English Translation, 2 pages).

*Primary Examiner* — Courtney D Heinle
*Assistant Examiner* — Andrew J Marien
(74) *Attorney, Agent, or Firm* — Michael Best & Friedrich LLP (57) ABSTRACT

The invention relates to a side channel compressor (1) for a fuel cell system for conveying and/or compressing a gas, particularly hydrogen, comprising a housing (3) and a drive (6), wherein the housing (3) has a housing upper part (7) and a housing lower part (8), a compressor chamber (30) which is circulating in the housing (3) about an axis of rotation (4) and has at least one peripheral side channel (19), a compressor wheel (2) located in the housing (3), which is rotatably arranged about an axis of rotation (4) and is driven by the drive (6), said compressor wheel (2) comprising blades (5) arranged on the periphery thereof in the region of the compressor chamber (30), and comprising respectively a (Continued)

gas inlet opening (14) embodied on the housing (3) and a gas outlet opening (16) which are fluidically interconnected via the compressor chamber (30), in particular the at least one side channel (19). According to the invention, the drive (6) is designed as an axial field electric motor (6) which has a stator (12) and a rotor (10), wherein the stator (12) and the rotor (10) have a disc-shaped design and are formed so as to move about the axis of rotation (4), and wherein the stator (12) is arranged next to the rotor in the direction of the axis of rotation (4).

20 Claims, 4 Drawing Sheets

(51) Int. Cl.
*F04D 29/58* (2006.01)
*F04D 27/00* (2006.01)
*F04D 29/08* (2006.01)
*F04D 25/06* (2006.01)
*F04D 29/28* (2006.01)
*F04D 29/26* (2006.01)

(52) U.S. Cl.
CPC .............. *F04D 29/08* (2013.01); *F04D 29/18* (2013.01); *F04D 29/26* (2013.01); *F04D 29/284* (2013.01); *F04D 29/58* (2013.01)

(56) References Cited

U.S. PATENT DOCUMENTS

| | | | |
|---|---|---|---|
| 2003/0231953 A1* | 12/2003 | Ross | F04D 5/005 415/55.1 |
| 2010/0221097 A1* | 9/2010 | Dittmar | F04D 23/008 415/71 |
| 2013/0157154 A1* | 6/2013 | Hausmann | H01M 8/04111 429/415 |
| 2016/0001624 A1* | 1/2016 | Meissner | F04B 27/04 280/124.16 |
| 2019/0003488 A1* | 1/2019 | Stefanovic | F04D 17/10 |
| 2020/0378377 A1* | 12/2020 | Kirchhoff | H02K 7/088 |

FOREIGN PATENT DOCUMENTS

| | | | | |
|---|---|---|---|---|
| CN | 105683580 A | | 6/2016 | |
| CN | 107110169 A | | 8/2017 | |
| DE | 2342245 | | 3/1974 | |
| DE | 102010035039 | * | 8/2010 | ............. H02P 31/00 |
| DE | 102010035039 | | 2/2012 | |
| DE | 102011006487 | | 10/2012 | |
| JP | 56171695 | | 12/1981 | |
| JP | 2002266785 A | | 9/2002 | |
| JP | 2006164750 | | 6/2006 | |
| WO | 9611717 A1 | | 4/1996 | |
| WO | 2017009065 | | 1/2017 | |

* cited by examiner

SIDE CHANNEL COMPRESSOR FOR A FUEL CELL SYSTEM FOR CONVEYING AND/OR COMPRESSING A GASEOUS MEDIUM

BACKGROUND OF THE INVENTION

The present invention relates to a side channel compressor for a fuel cell system for conveying and/or compressing a gaseous medium, in particular hydrogen, which is provided in particular for use in vehicles with a fuel cell drive.

In the vehicle sector, in addition to liquid fuels, gaseous fuels will also take on increasing significance in the future. Particularly in vehicles with a fuel cell drive, hydrogen gas flows have to be controlled. The gas flows are in this instance no longer controlled in a discontinuous manner as with the injection of liquid fuel, but instead the gas is removed from at least one high-pressure tank and directed via a supply line of a medium-pressure pipe system to an ejector unit. This ejector unit leads the gas via a connection line of a low-pressure line system to a fuel cell. After the gas has flowed through the fuel cell, it is directed via a return line back to the ejector unit. In this instance, the side channel compressor which supports the gas return in technical flow terms and in a technically efficient manner may be interposed. In addition, side channel compressors are used to support the flow build-up in the fuel cell drive, in particular in the event of a (cold) start of the vehicle after a specific parking time. The driving of this side channel compressor is generally carried out via electric motors, which during operation in vehicles are supplied with voltage via the vehicle battery.

DE 10 2010 035 039 A1 discloses a side channel compressor for a fuel cell system in which a gaseous medium, in particular hydrogen, is conveyed and/or compressed. The side channel compressor has in this instance a housing and a drive, wherein the housing has a housing upper portion and a housing lower portion. There is further arranged in the housing a compressor chamber which extends around a rotation axis and which has at least one circumferential side channel. In the housing there is a compressor wheel which is rotatably arranged about the rotation axis and which is driven by the drive, wherein the compressor wheel has blades which are arranged on the circumference thereof in the region of the compressor chamber. In addition, the side channel compressor known from DE 10 2010 035 039 A1 has a gas inlet opening and a gas outlet opening which are formed in each case in the housing and which are connected to each other in fluid terms via the compressor chamber, in particular the at least one side channel. In this instance, the side channel compressor has the drive, which has a stator which extends in a sleeve-like manner around the rotation axis and at the inner side of which a rotor which is arranged on a rotor shaft is arranged. The rotor shaft is in this instance supported by means of two ball bearings which are arranged in each case axially with respect to the end sides. The side channel compressor known from DE 10 2010 035 039 A1 can use the stator as a heating element in this instance.

The side channel compressor known from DE 10 2010 035 039 may have some disadvantages.

On the one hand, the compressor wheel is constructed in a disk-like manner and has a large diameter radially with respect to the rotation axis and consequently requires a large amount of structural space radially with respect to the rotation axis, whilst the compressor wheel is constructed to be narrow axially with respect to the rotation axis and consequently requires little structural space radially with respect to the rotation axis. On the other hand, however, the drive set out has with the stator arranged outside the rotor a small diameter radially with respect to the rotation axis and consequently requires little structural space radially with respect to the rotation axis. As a result of the arrangement of the stator and rotor, however, the drive requires a large amount of structural space axially with respect to the rotation axis. As a result of these conflicting structural space requirements of the drive and the compressor wheel, during a combination and/or assembly of the two components, a bulky and space-consuming overall system of the side channel compressor which cannot be used in a compact construction type is produced.

Furthermore, the side channel compressor known from DE 10 2010 035 039 has the disadvantage that the thermal energy, in the event of control and/or use of the stator as a heating element, has to travel a long distance over a large number of components until it can reach the region in which the movable components can freeze together by means of ice bridges. In this instance, a large amount of energy is lost as a result of thermal losses since a large region in which no ice bridges can be formed and/or in which no movable components are located is provided with thermal energy.

SUMMARY OF THE INVENTION

According to the invention, a side channel compressor for a fuel cell system is proposed for conveying and/or compressing a gaseous medium, in particular hydrogen.

There is proposed a side channel compressor in which a drive is constructed as an axial field electric motor which has a stator and a rotor, wherein the stator and the rotor are constructed so as to extend in a disk-like manner around a rotation axis and wherein the stator is arranged in the direction of the rotation axis beside the rotor. In this manner, it is possible for the drive to be able to be implemented as a component which is narrow in the direction of the rotation axis and which, as a result of its diameter, requires a large amount of structural space radially with respect to the rotation axis, but is constructed to be narrow axially with respect to the rotation axis and consequently requires little structural space axially with respect to the rotation axis. The other components of the side channel compressor, in particular a housing and a compressor wheel, are also constructed to be narrow, are in the same manner implemented as components which are narrow in the direction of the rotation axis and which, as a result of their diameter, require a large amount of structural space radially with respect to the rotation axis, but are constructed to be narrow axially with respect to the rotation axis and consequently require little structural space axially with respect to the rotation axis. In a combination of the drive with the other components of the side channel compressor, in particular the housing and the compressor wheel, components with identical structural space specifications are consequently combined, whereby a compact and space-saving construction type of the overall side channel compressor can be achieved. In this instance, the compact and space-saving construction type of the side channel compressor is produced by means of the smallest possible surface in relation to the volume. This affords the advantage that only a small installation space is required by the client, for example, in a vehicle. Furthermore, the compact construction type of the side channel compressor, in particular with the smallest possible surface in relation to the volume, affords the advantage that a cooling of the side channel compressor at low ambient temperatures, in particular in the range below 0° C., is carried out more slowly and consequently the appearance of ice bridge formation can be delayed for longer.

According to an advantageous embodiment, an air gap which extends in a disk-like manner around the rotation axis is formed between the stator and the rotor in such a manner that the air gap is delimited in only one direction of the rotation axis by the stator and in the other direction of the rotation axis by the rotor. Furthermore, the disk-like rotor is arranged axially with respect to the rotation axis beside the compressor wheel, in particular on a hub disk of the compressor wheel, wherein the rotor is connected in a non-positive-locking and/or positive-locking and/or materially engaging manner to the compressor wheel. In this manner, the advantage can be afforded that an efficient and more rapid pre-heating of the side channel compressor is possible at least by means of the stator in order to carry out a reliable cold-start procedure of the side channel compressor and the fuel cell system. At low ambient temperatures, in particular in the range below 0° C., after the fuel cell system and the side channel compressor have been completely switched off, fluid, in particular water, can condense from a recirculation medium which is intended to be conveyed. In this instance, in particular with long parking times, ice bridges can form between the movable parts of the side channel compressor, in particular the compressor wheel and the housing. Such ice bridges may make more difficult and/or completely prevent starting, in particular a cold start, of the fuel cell system, in particular the side channel compressor. When the vehicle and consequently the fuel cell system is started, this can further lead, in the event of excessive ice bridge formation, to the drive becoming blocked, whereby the rotating components, in particular the compressor wheel, can become damaged and/or a starting of the system is made more difficult or delayed or completely prevented. The possibility of an efficient and rapid pre-heating of the side channel compressor as a result of the structural configuration of the rotor and/or the stator as disk-like components enables rapid breakdown of the ice bridges, in particular by means of melting, using the drive. The advantage is thereby achieved of carrying out a reliable and rapid cold start procedure of the side channel compressor and the fuel cell system. This leads to a higher degree of reliability of the fuel cell system and/or the vehicle.

In addition, the advantage can thus be achieved that, as a result of the arrangement of the air gap which extends in a disk-like manner around the rotation axis between the stator and the rotor, a compact construction type of the side channel compressor can be achieved. Furthermore, this arrangement of the air gap, the stator and the rotor affords the advantage of a rapid assembly and disassembly in the direction of the rotation axis, whereby the assembly costs can be reduced and whereby maintenance costs which occur can be reduced.

According to a particularly advantageous embodiment, the disk-like rotor has a cylindrical attachment which extends in the direction of the rotation axis, wherein the cylindrical attachment is arranged at the side of the rotor facing away from the stator and wherein the covering face of the outer diameter of the cylindrical attachment extends circumferentially around the rotation axis. In this manner, the advantage can be achieved that the rotor achieves optimum use of the structural space present in the housing, whilst in addition a guiding of the rotor which extends axially and radially with respect to the rotation axis can be carried out via the cylindrical attachment. In this instance, the guiding may be carried out in an exemplary embodiment in such a manner that a thin layer of the medium which is intended to be conveyed is located between the cylindrical attachment and the housing and this layer is brought about a guiding of the compressor wheel, in particular the cylindrical attachment. In another exemplary embodiment, there may further be produced a direct abutment of the rotor against other components of the side channel compressor by means of the cylindrical attachment and thereby a guiding in the rotation direction. As a result of the embodiments described, the service-life of the compressor wheel and the side channel compressor can be increased.

According to an advantageous embodiment, the compressor wheel forms in the region of a compressor chamber between two adjacent blades in each case a conveyor cell. This conveyor cell is delimited radially outward with respect to the rotation axis by an external circumferential delimiting ring and inwardly by an internal circumferential delimiting ring of the compressor wheel. In this instance, the conveyor cell has at least one opening in the direction of the rotation axis. The external delimiting ring and the internal delimiting ring extend in this instance in a rotationally symmetrical manner around the rotation axis. In this manner, it is possible for the flow of the gaseous medium, in particular a circulation flow, to flow only axially with respect to the rotation axis toward and away from the conveyor cell and consequently only an axial movement of the gaseous medium to be adjusted between the at least one side channel and the conveyor cell. This affords the advantage that a flow of the gaseous medium is adjusted only in the region in which it is desirable, that is to say, between the side channel and the conveyor cell. Friction losses as a result of friction of the medium with other regions of the side channel compressor which do not bring about an improved conveying and compression of the gaseous medium can be reduced to the greatest possible extent and/or prevented, whereby the degree of efficiency of the side channel compressor can be increased.

According to a particularly advantageous development, the cylindrical attachment at the inner diameter thereof is in contact with an outer diameter of a bearing and at the outer diameter thereof with the inner diameter of the compressor wheel, in particular with the hub disk of the compressor wheel. In this instance, the contact of the cylindrical attachment with respect to the bearing and/or the compressor wheel is carried out in particular in a non-positive-locking manner by means of an interference fit. In this manner, on the one hand, an optimal support of the compressor wheel can be achieved since the compressor wheel is securely connected to the rotor by means of the non-positive-locking interference fit. In this instance, a tilting movement and/or a wobbling movement and/or a movement of the compressor wheel radially and/or axially with respect to the rotation axis is prevented by the compressor wheel being guided by the rotor and indirectly via the bearing.

Furthermore, the advantage can be afforded that, with a cold start procedure of the side channel compressor using the drive, a rapid heating of the compressor wheel can be carried out since the thermal energy only has to travel a short distance, in particular from the rotor via the cylindrical attachment into the compressor wheel to the internal delimiting ring and to an external annular collar. As a result of the short distances between the rotor and the regions in which ice bridges may form, the thermal energy from the drive only has to heat a small volume of components of the side channel compressor, whereby a more rapid and energy-efficient heating of the side channel compressor can be achieved. Consequently, the thermal energy losses can be reduced since the thermal energy as a result of the structural configuration of the side channel compressor can be directed selectively into the regions which have to be heated, in particular as a result of the formation of ice bridges.

According to an advantageous embodiment, a housing lower portion has a cylindrical bearing pin, wherein the bearing pin extends in such a manner in the direction of the rotation axis that the covering face thereof extends circumferentially around the rotation axis and wherein the bearing, which is constructed in particular as a deep groove ball bearing, is in contact with the inner diameter thereof with the covering face of the bearing pin radially with respect to the rotation axis. In this manner, the advantage can be afforded, in particular with the configuration of the side channel compressor according to the invention, in which the drive is constructed as an axial field electric motor, that a drive shaft for transmitting a rotational movement and a torque from the drive to the compressor wheel and a second bearing are no longer required. As a result of the axial pretensioning of the bearing via the rotor, the advantage can be afforded that the compressor wheel via the bearing and the axial force introduced via the rotor is fixed in position axially and radially with respect to the rotation axis and, furthermore, a tilting or wobbling of the compressor wheel is prevented, whilst a rotational movement of the compressor wheel is possible in an almost unlimited manner. Since the magnet and/or the magnetic components in the stator are constructed as permanent magnets, the bearing is permanently in a pretensioned state, even when the axial field electric motor is switched off. It is thereby possible, on the one hand, to achieve the advantage that the components drive shaft and second bearing can be saved, which reduces the component costs and the assembly costs. In addition, the advantage can be achieved that the internal friction losses can be reduced since fewer components are moved, in particular moved in a rotational manner. The degree of efficiency of the side channel compressor can thereby be improved and consequently the operating costs can be reduced. In addition, in this manner, the advantage can be achieved that a compact construction type of the side channel compressor can be achieved.

According to an advantageous development, the rotor is arranged radially with respect to the rotation axis almost completely in the region of the inner diameter of the compressor wheel so that an axis of symmetry of the disk-like rotor extends virtually in a congruent manner with the axis of symmetry of the compressor wheel and wherein the rotor is in contact with an outer diameter of the bearing and an inner diameter of the compressor wheel, wherein the rotor forms in a joint region which extends axially with respect to the rotation axis a contact region with the compressor wheel. In this manner, the advantage can be afforded that a large part of the material for the compressor wheel can be saved since the region of the compressor wheel between the internal delimiting ring and the bearing can be replaced by the component the rotor. The material costs and assembly costs can thereby be reduced. Furthermore, the dimensions which have to be moved within the side channel compressor are thereby reduced, which is particularly advantageous when starting and braking the side channel compressor, whereby the required energy for operating the side channel compressor can be reduced and consequently the operating costs can be reduced. As a result of the further shortened distances of the rotor with respect to the regions of the side channel compressor in which ice bridges may be formed, a more rapid and energy-efficient heating of the side channel compressor can be achieved. Consequently, the thermal energy losses can be reduced since the thermal energy can be directed as a result of the structural configuration of the side channel compressor selectively into the regions which have to be heated, in particular as a result of ice bridge formation. In this instance, the rotor is arranged within the compressor wheel close to the region of the internal delimiting ring and the region of the external annular collar, whereby the rotor and/or the compressor wheel can be heated by power being supplied to the stator.

According to a particularly advantageous embodiment, the stator is at least partially surrounded by a pot-like sealing element. In this instance, the pot-like sealing element is in particular constructed as a plastics material overmolding of the stator, wherein the sealing element brings about an encapsulation of the electrical components of the side channel compressor, in particular the stator, by the medium of the compressor chamber, in particular hydrogen. In this manner, the advantage can be achieved that the region of the stator which has electrical lines and coils and which is consequently particularly susceptible to penetrating moisture can be encapsulated. In this instance, the encapsulation is carried out by using the pot-like sealing element in such a manner that a short-circuit as a result of fluid introduction can be prevented since all electrical components, such as, for example, the magnet coil, are located within the encapsulated chamber and are consequently protected against fluid. In this instance, the pot-like sealing element is in abutment with the housing with a large portion of the surface thereof, in particular a housing upper portion, in such a manner, in particular radially with respect to the rotation axis, that a large contact face is formed, wherein in particular the pot-like sealing element presses with a force against the surface of the housing, whereby an improved encapsulation of the region of the stator can be achieved since the moisture would have to travel a relatively long penetration path between the pot-like sealing element and the housing. The force, which is in particular a sealing force, is achieved in such a manner that the surface of the pot-like sealing element which is formed radially with respect to the rotation axis forms a slightly enlarged outer diameter in relation to the inner diameter of the housing in the contact region. In this instance, it is advantageous that the sealing element is produced from a resilient material, and wherein the pot-like sealing element during assembly is compressed in the region of the housing radially toward the rotation axis, wherein the pot-like sealing element after completed assembly returns to its original shape again as a result of the resilience and in this instance presses with a pressing force and/or clamping force and/or moves into abutment against the surface of the housing, in particular against an inner diameter of the housing. An improved encapsulation of the electrical components of the side channel compressor can thereby be achieved and consequently the service-life can be increased. Furthermore, the probability of failure of the axial field electric motor and/or the side channel compressor as a result of prior damage of the sealing element prior to assembly can be reduced. Furthermore, in this manner, the advantage can be achieved that a simple, cost-effective and rapid exchange of the drive, in particular the stator and the electrical components, can be carried out. In this instance, these components can be located completely in the encapsulated region within the drive housing and the pot-like sealing element, wherein this modular subassembly can be disassembled and removed completely from the side channel compressor in the direction of the rotation axis.

According to an advantageous development, the compressor wheel has an internal delimiting ring which extends around the rotation axis, wherein the internal delimiting ring is formed on the inner diameter of the circumferential compressor chamber on the compressor wheel and wherein the circumferential internal delimiting ring brings about a separation and/or encapsulation of the compressor chamber from an inner region of the side channel compressor. Furthermore, the compressor wheel has in the region of the external delimiting ring at least one external circumferential annular collar which in particular extends radially with respect to the rotation axis, wherein the at least one circumferential annular collar extends at the side of the external delimiting ring facing away from the rotation axis. In this manner, the advantage can be achieved that it is possible for the flow of the gaseous medium, in particular a circulation flow, to flow only axially with respect to the rotation axis to and from the conveyor cell and consequently only an axial movement of the gaseous medium between the at least one side channel and the conveyor cell to be produced. This affords the advantage that a flow of the gaseous medium is produced only in the region in which it is desired, that is to say, between the side channel and the conveyor cell. Friction losses as a result of friction of the medium with other regions of the side channel compressor, which do not bring about an improved conveying and compression of the gaseous medium, can be reduced to the greatest possible extent and/or prevented, whereby the degree of efficiency of the side channel compressor can be increased. Furthermore, an undesirable temperature increase of the gaseous medium as a result of friction can be reduced. Another advantage which can be achieved is an at least partial encapsulation of the at least one side channel and/or the conveyor cell relative to an outer region and/or an inner region in the housing.

According to an advantageous method, power is supplied to the stator without a rotary field being formed between the stator and the rotor and consequently no or a very small rotational movement of the rotor about the rotation axis being produced. In this instance, the stator becomes heated when power is supplied to the coils of the stator for a short period of time, in particular as a result of the occurrence of power loss which is released as thermal energy. From the stator, this thermal energy then spreads to the other components of the side channel compressor. In addition, in another possible embodiment, by means of an advantageous method, an application of power to the stator can be carried out in such a manner that an inductive heating of the rotor is carried out, wherein in particular a thermal energy transmission from the rotor to the compressor wheel is carried out and wherein the heat spreads from the rotor in a flow direction into the region of the axial ends of the internal delimiting ring and the at least one external annular collar of the compressor wheel. In this manner, the advantage can be afforded that, as a result of application of power to the stator when a rotary field is not present, a heating of the rotor is produced, wherein, to this end, in particular the effect of induction is used. In this instance, the rotor which in particular comprises a thermally conductive material can be heated, which is advantageous in particular in the event of a cold start procedure of the side channel compressor and/or the vehicle. In this instance, the rotor is heated and transmits, for example, as a result of the thermal conductivity thereof, the thermal energy to the compressor wheel. In this instance, the thermal energy transmission is carried out in a flow direction into the region between the compressor wheel and the housing, in which ice bridges have formed. These ice bridges are produced as a result of a fluid which is present, in particular water, which is formed during operation of the fuel cell system and which accumulates in particular in the region with a small gap dimension between the compressor wheel and the housing. When the side channel compressor and/or the vehicle is switched off, in particular over a relatively long period of time, and/or at low ambient temperatures below freezing point, the fluid freezes and ice bridges are formed. When the side channel compressor is started up and/or started, these ice bridges can lead to damage to the side channel compressor and/or a prevent a rotation of the compressor wheel in the housing as a result of blockage. Furthermore, when the compressor wheel is started up, a breaking-off may be brought about, in which sharp-edged ice pieces are released and can damage components downstream of the side channel compressor and/or a fuel cell in the conveying direction, in particular the diaphragm of the fuel cell. As a result of the rotor being heated, the compressor wheel and in particular the region of the internal delimiting ring and the external annular collar, which both in each case form a small spacing, in particular a small gap dimension, with respect to the housing are heated. The ice bridges thereby melt and the fluid changes from a solid to a liquid aggregation state and can be discharged, for example, by means of a purge valve and/or drain valve which is present in the fuel cell system. In this manner, the service-life of the side channel compressor and/or the fuel cell system can be increased.

According to a particularly advantageous method, by applying power to the stator, the axial force on the rotor is brought about in the direction of the rotation axis, whereby the rotor moves in the direction of the rotation axis and wherein a shaking movement is brought about as a result of a variation and/or reversal of the electrical power supply. In this instance, as a result of the shaking movement of the rotor, a changing increase and decrease of the spacing which extends in the direction of the rotation axis between the compressor wheel and the housing upper portion and/or the housing lower portion is brought about, in particular in the region of the axial ends of the internal delimiting ring and the at least one external annular collar of the compressor wheel. In this manner, the advantage can be achieved that ice bridges which occur between the compressor wheel and the housing and which can in particular be formed when the side channel compressor is switched off for a relatively long period of time and/or at low ambient temperatures below freezing point, are destroyed by the shaking movement of the rotor. Consequently, the ice bridges which comprise, for example, ice crystals, are smashed by the rotor and/or the compressor wheel carrying out a shaking movement and/or the rotor moving back and forth in the direction of the rotation axis. In this instance, it is advantageous for the crystalline structure of the frozen fluid to be able to be neutralized and/or destroyed particularly efficiently by a shaking movement or a back and forth movement of the compressor wheel. Consequently, on the one hand, the cold start capability of the side channel compressor can be improved by the advantageous method. On the other hand, the probability of failure of the side channel compressor and/or the entire fuel cell system can be reduced since the ice bridges are almost completely eliminated.

BRIEF DESCRIPTION OF THE DRAWINGS

With reference to the drawings, the invention is described in greater detail below.

In the drawings.

DETAILED DESCRIPTION

Figure 1:
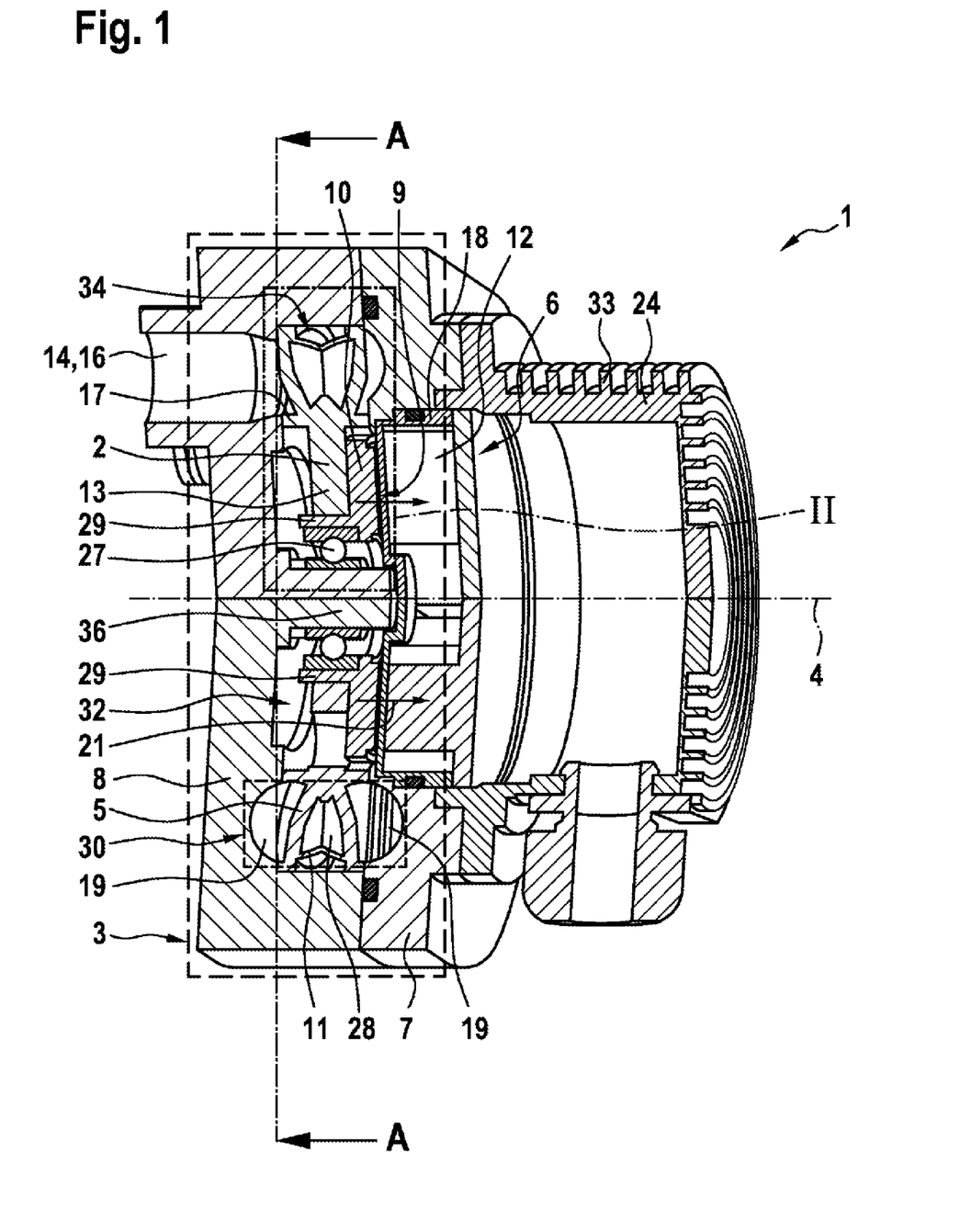
FIG. 1 is a schematic sectioned view of a side channel compressor according to the invention according to a first embodiment.

The illustration according to FIG. 1 shows a longitudinal section through a side channel compressor 1 which is proposed according to the invention and which is formed in a rotationally symmetrical manner with respect to a rotation axis 4.

In this instance, the side channel compressor 1 has a compressor wheel 2 which is constructed in particular as a closed disk-like compressor wheel 2 and which is supported in a housing 3 so as to be able to be rotated about the horizontally extending rotation axis 4. In this instance, a drive 6, in particular an electric drive 6, acts as a rotary drive 6 of the compressor wheel 2. The drive 6 is in this instance in particular constructed as an axial field electric motor 6, wherein it has a stator 12 and a rotor 10, wherein the stator 12 and the rotor 10 are formed so as to extend in a disk-like manner around the rotation axis 4 and wherein the stator 12 is arranged in the direction of the rotation axis 4 beside the rotor 10. In this instance, an air gap 9 which extends in a disk-like manner around the rotation axis 4 is formed between the stator 12 and the rotor 10 in such a manner that the air gap 9 is delimited in only one direction of the rotation axis 4 by the stator 12 and in the other direction of the rotation axis 4 by the rotor 10. Furthermore, the disk-like rotor 10 is arranged axially with respect to the rotation axis 4 beside the compressor wheel 2, in particular on a hub disk 13 of the compressor wheel 2, wherein the rotor 10 is connected in a positive-locking and/or non-positive-locking and/or materially engaging manner to the compressor wheel 2. Furthermore, the stator 12 may have cooling channels, in particular cooling channels which extend in the direction of the rotation axis 4, in order to reduce a heating of the stator 12 during operation, in particular during operation at a high speed of the compressor wheel and/or an operating state of the stator 12 in which it produces a high degree of power loss and heat loss. The stator may additionally have a magnet and/or the magnetic components, in particular a permanent magnet. As a result of the magnetic effect of the permanent magnet on the rotor and/or on the compressor wheel, the bearing is permanently pretensioned, even when the axial field electric motor is switched off. In this instance, the compressor wheel and/or the rotor may have permanent magnets which interact with the magnet of the stator in such a manner that the compressor wheel is pulled toward the stator in the direction of the rotation axis.

The housing 3 comprises a housing upper portion 7 and a housing lower portion 8 which are connected to each other. In addition, at least one sealing element, in particular a sealing element which extends around the rotation axis 4, may be arranged between the housing upper portion 7 and the housing lower portion 8 in order, on the one hand, to bring about improved encapsulation against the penetration of moisture and/or contamination from the outer side. On the other hand, however, an improved encapsulation against the loss of the medium which is intended to be conveyed is also achieved in order to prevent the medium which is intended to be conveyed from escaping into the environment.

It is further shown in FIG. 1 that the disk-like rotor 10 has a cylindrical attachment 29 which extends in a direction of the rotation axis 4, wherein the cylindrical attachment 29 is arranged at the side of the rotor 10 facing away from the stator 12, and wherein the covering face of the outer diameter of the cylindrical attachment 29 extends circumferentially around the rotation axis 4. Furthermore, the cylindrical attachment 29 is in contact at the inner diameter thereof with an outer diameter of a bearing 27 and at the outer diameter thereof with the inner diameter of the compressor wheel 2, in particular with the hub disk 13 of the compressor wheel 2, wherein the contact of the cylindrical attachment 29 with respect to the bearing 27 and/or the compressor wheel 2 is carried out in particular in a non-positive-locking manner by means of an interference fit. Furthermore, the housing lower portion 8 has a cylindrical bearing pin 36, wherein the bearing pin 36 extends in the direction of the rotation axis 4 in such a manner that the covering face thereof extends circumferentially around the rotation axis 4 and wherein the bearing 27 which is constructed in particular as a deep groove ball bearing 27, radially with respect to the rotation axis 4 is in contact via the inner diameter thereof with the covering face of the bearing pin 36.

Furthermore, the compressor wheel 2 forms a conveyor cell 28 which is adjacent at the outer side to the hub disk 13. This conveyor cell 28 of the compressor wheel 32 extends circumferentially around the rotation axis 4 in a circumferential compressor chamber 30 of the housing 3, wherein the compressor wheel 2 and/or the conveyor cell 28 has on the respective outer circumference a circumferential external delimiting ring 11, wherein in particular the external delimiting ring 11 delimits the conveyor cell 28 at the external outer diameter thereof which extends around the rotation axis 4. In addition, the compressor wheel 2 has an internal delimiting ring 17 which extends around the rotation axis 4, wherein the internal delimiting ring 17 is formed on the inner diameter of the circumferential compressor chamber 30 on the compressor wheel 2 and brings about a separation and/or encapsulation of the compressor chamber 30 from an inner region 32 of the side channel compressor 1. However, the external delimiting ring 11 brings about a separation and/or encapsulation of the compressor chamber 30 from an outer region 34 of the side channel compressor 1. The compressor wheel 2 additionally forms a plurality of blades 5 in order to accelerate and/or compress the medium which is intended to be conveyed, such as, for example, hydrogen, circumferentially around the rotation axis 4, in particular in the region between the internal delimiting ring 17 and the external delimiting ring 11. In this instance, the compressor wheel 2 forms in the region of the compressor chamber 30 between two adjacent blades 5 the conveyor cell 28 which is delimited radially with respect to the rotation axis 4 inward by means of the internal circumferential delimiting ring 17. The housing 3, in particular the housing upper portion 7 and/or the housing lower portion 8, has in the region of the compressor chamber 30 at least one circumferential side channel 19. In this instance, the side channel 19 extends in the housing 3 in the direction of the rotation axis 4 in such a manner that it extends axially with respect to the conveyor cell 28 at one side or at both sides. The side channel 19 may in this instance extend at least in a part-region of the housing 3 circumferentially around the rotation axis 4, wherein, in the part-region in which the side channel 19 is not formed in the housing 3, an interrupter region 15 is formed in the housing 3 (see FIG. 2).

The axial field electric motor 6 shown in FIG. 1 is constructed in such a manner that the stator 12 is at least partially surrounded by a pot-like sealing element 18, wherein the pot-like sealing element 18 is constructed in particular as a plastics material overmolding 18 of the stator 12, and wherein the sealing element 18 brings about an encapsulation of the electrical components of the side channel compressor 1, in particular the stator 12, by the medium of the compressor chamber 3, in particular hydrogen. In addition, an encapsulation of the electrical components with respect to additional fluids, such as, for example, water, can be brought about. The pot-like sealing element 18 may in this instance comprise a resilient material, such as, for example, an elastomer material, wherein the sealing element 18 may have additional structure-reinforcing materials. As a result of the resilient construction of the sealing element 18, the encapsulating effect is improved since the sealing element can be applied in an optimum manner against the surrounding components of the side channel compressor 1 and/or move into abutment therewith.

Furthermore, the drive 6 is surrounded by a drive housing 24 and consequently encapsulated with respect to the region outside the side channel compressor 1. The drive housing 24 is in this instance in abutment with the housing 3, in particular the housing upper portion 7, wherein the drive housing 24, for example, by means of a shoulder which is formed forms at least two abutment faces which extend axially with respect to the rotation axis 4 and forms with respect to the housing 3 at least one abutment face which extends radially with respect to the rotation axis 4. As a result of the shoulder, an orientation and/or centering of the drive housing 24 with respect to the housing 3 is further possible, in particular during assembly. In addition, at least one sealing element, in particular a sealing element which extends around the rotation axis 4, may be arranged between the drive housing 24 and the housing 3, wherein the at least one sealing element is, for example, an O-ring. The drive housing 24 may further have on the surface thereof cooling ribs 33 which bring about improved discharge of thermal energy into the environment. Heat enters the drive 6 in such a manner that driving the compressor wheel 2 produces excess thermal energy which is present in particular as friction heat or inductively magnetic heat. This heat, as a result of the cooling ribs 33 of the drive 6, can be discharged more rapidly to the environment since the drive 6 has an increased surface-area as a result of the cooling ribs 33.

Furthermore, the housing 3, in particular the housing lower portion 8, has a gas inlet opening 14 and a gas outlet opening 16. In this instance, the gas inlet opening 14 and the gas outlet opening 16, in particular via the at least one side channel 19, are connected to each other in fluid terms. From the drive 6, a torque is transmitted via the rotor 10 to the compressor wheel 2. In this instance, the compressor wheel 2 is rotationally moved and the conveyor cell 28 moves with a rotational movement circumferentially around the rotation axis 4 through the compressor chamber 30 in the housing 3 in the direction of a rotational direction 20 (see FIG. 2). In this instance, a gaseous medium which is already in the compressor chamber 30 is also moved by the conveyor cell 28 and in this instance conveyed and/or compressed. In addition, there is produced a movement of the gaseous medium, in particular a flow exchange, between the conveyor cell 28 and the at least one side channel 19. Furthermore, the gaseous medium, which in particular is an unconsumed recirculation medium from a fuel cell, flows via the gas inlet opening 14 into the compressor chamber 30 of the side channel compressor 1 and/or is supplied to the side channel compressor 1 and/or is drawn from the region which is arranged upstream of the gas inlet opening 14. In this instance, the gaseous medium after completely passing through the gas outlet opening 16 of the side channel compressor 1 is discharged and flows in particular to a jet pump of a fuel cell system.

The rotor 10 has in an exemplary embodiment at least one magnet, in particular a permanent magnet, whilst the stator 12 is constructed as a coil member 12 and/or wherein the stator 12 also has at least one magnet, in particular a permanent magnet. The coil member 12 may in this instance contain a different number of windings, wherein the windings are in particular spatially offset winding loops which comprise, for example, copper. In addition, the stator 12 may have a cooling in order to be able to control and/or lower the temperature during high-frequency permanent operation of the side channel compressor 1. As a result of the construction of the drive 6 as an axial field electric motor 6, a compact construction type of the drive 6 and the side channel compressor 1 can be achieved. As a result of the at least one permanent magnet, the rotor 10 is continuously and permanently, in particular when the power supply to the stator 12 is switched off, drawn in the direction of the rotation axis 4 toward the stator 12, in particular by means of an axial force 21, in particular by means of a magnetic force. In this instance, the bearing 27 is acted on with an axial pretensioning, whereby the deep groove ball bearing 27 acts as an axial bearing and/or as a radial bearing. Consequently, when the stator 12 is supplied with electrical power, the axial force 21 on the rotor 10 is produced in the direction of the rotation axis 4, whereby an axial pretensioning of the bearing 27, in particular the deep groove ball bearing 27, is achieved at least indirectly via the rotor 10. In another exemplary embodiment, the axial force 21 can press the rotor 10 axially with respect to the rotation axis 4 away from the stator 12 by means of the axial force 21, wherein a pretensioning of the bearing 27 is also brought about.

Figure 2:
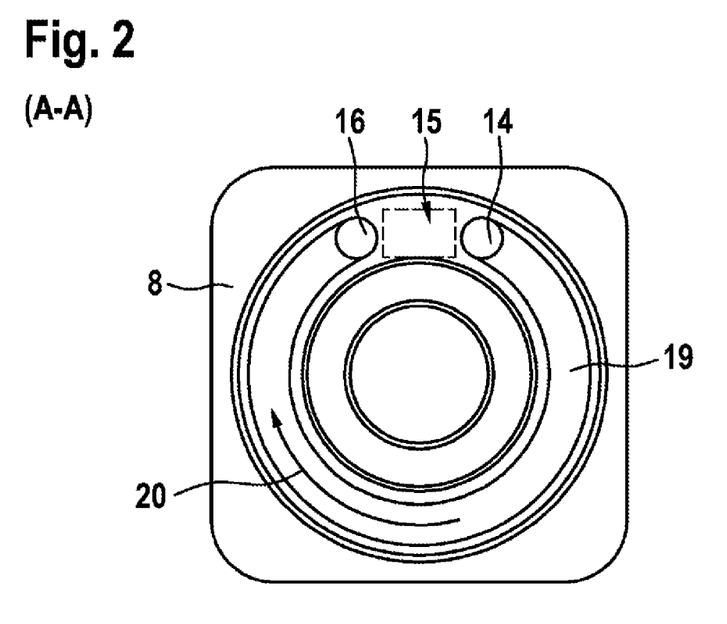
FIG. 2 is an enlarged section of the side channel compressor designated A-A in FIG. 1.

FIG. 2 is an enlarged illustration of a section of the side channel compressor 1 designated A-A in FIG. 1, wherein the housing lower portion 8, the gas inlet opening 14, the gas outlet opening 16, the interrupter region 15, the side channel 19, the rotation direction 20 (of the compressor wheel 2 which is not illustrated) and the first circumferential sealing element 29 are illustrated.

As illustrated in FIG. 2, the interrupter region 15 is located circumferentially around the rotation axis 4 in the housing 3 in particular between the gas inlet opening 14 and the gas outlet opening 16. The gaseous medium is conveyed by the compressor wheel 2 and/or flows in this instance from the gas inlet opening 14 to the gas outlet opening 16 and in this instance at least partially flows through the side channel 19. In this instance, with continued circulation from the gas inlet opening 14 to the gas outlet opening 16 in the rotation direction 20, the compression and/or the pressure and/or the flow speed of the gaseous medium in the conveyor cell 28 of the compressor wheel 2 and in the side channel 19 increases. As a result of the interruption region 15, a separation of a pressure side and an intake side is brought about, wherein the intake side is located in the region of the gas inlet opening 14 and the pressure side is located in the region of the gas outlet opening 16.

Figure 3:
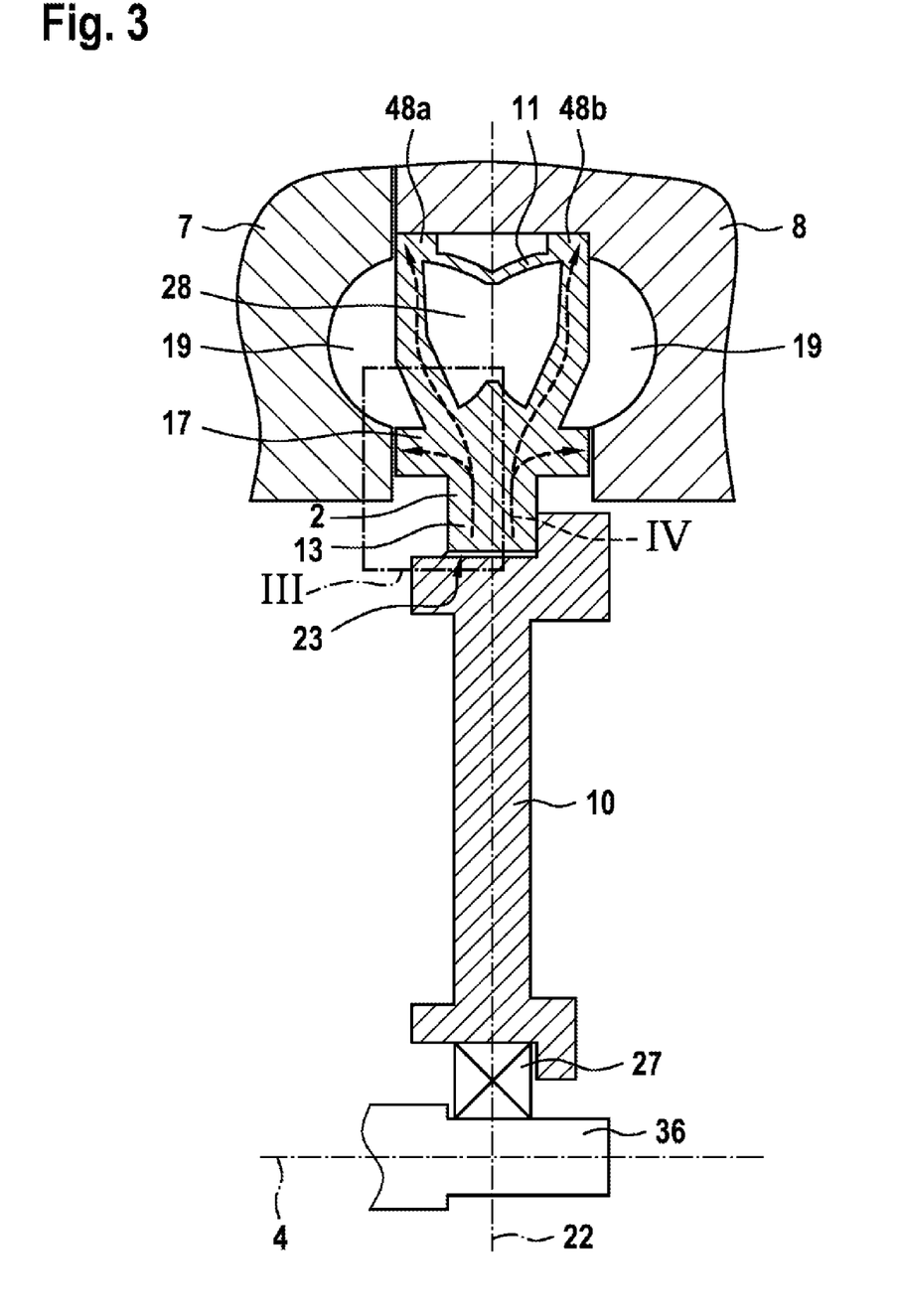
FIG. 3 is an enlarged cut-out of the side channel compressor designated II in FIG. 1 according to a second embodiment.

FIG. 3 shows an enlarged cut-out of the side channel compressor designated II in FIG. 1 according to a second embodiment. According to the second embodiment, the rotor 10 is in this instance arranged radially with respect to the rotation axis 4 almost completely in the region of the inner diameter of the compressor wheel 2 so that an axis of symmetry 22 of the disk-like rotor 10 extends almost congruently with the axis of symmetry 22 of the compressor wheel 2. Furthermore, in this instance, the rotor 10 is in contact with an outer diameter of the bearing 27 and an inner diameter of the compressor wheel 2, wherein the rotor 10 in a joining region 23 which extends axially with respect to the rotation axis 4, forms a contact region with the compressor wheel 2.

The compressor wheel 2 further has in the region of the external delimiting ring 11 at least one external circumferential annular collar 48a, b, which extends in particular radially with respect to the rotation axis 4. In addition, the at least one circumferential annular collar 48 a, b extends at the side of the external delimiting ring 11 facing away from the rotation axis 4. In this instance, the at least one side channel 19 is delimited outward in the housing 3 of the side channel compressor 1 by the external delimiting ring 11 and/or the at least one circumferential annular collar 48a, b. Furthermore, the at least one side channel 19 is delimited in the housing 3 of the side channel compressor 1 in an inward direction by the internal delimiting ring 17. By the compressor wheel being in abutment with the at least one external circumferential annular collar 48a, b and/or internal delimiting ring 17 with the housing upper portion 7 and/or the housing lower portion 8, at least via an intermediate medium, in particular the medium which is intended to be conveyed, an improved guiding of the compressor wheel 2 in the region of the conveyor cells 28 can be achieved. In this instance, the medium forms a residual gap between the compressor wheel 2 and the housing 3, wherein the medium with a residual gap which becomes smaller is compressed, and in this instance by means of an increased pressure a force which contributes to improved guiding of the compressor wheel in the rotational direction acts on the compressor wheel. The principle is similar to the principle of an air cushion in particular for damping or for providing a counter-force. This is particularly advantageous with significant impacts and blows during operation of the side channel compressor 1, for example, as a result of pressure peaks or dynamic pressure which occurs in the fuel cell system, whereby, for example, the service-life of the side channel compressor can be increased. The loading of the bearing 27 and/or the drive 6 can thereby be reduced.

Furthermore, the flow direction IV of the heat from the heated rotor 10, in particular with a cold start procedure, is shown in FIG. 3. In the context of this method for cold-starting the side channel compressor 1, in which a start-up of the side channel compressor 1 is carried out after longer parking times and/or low ambient temperatures, the rotor 10 and the compressor wheel 2 in the regions facing the housing 3 are heated. In this instance, power is supplied to the stator 12 without a rotary field being formed between the stator 12 and the rotor 10 and consequently no or a very small rotational movement of the rotor 10 about the rotation axis 4 being produced. Using the power supply of the stator 12, an inductive heating of the rotor 10 is brought about, wherein a transfer of thermal energy from the rotor 10 to the compressor wheel 2 is carried out and wherein the heat from the rotor 10 spreads in a flow direction IV into the region of the axial ends of the internal delimiting ring 17 and the at least one external annular collar 48 of the compressor wheel 2. In this instance, the regions of the compressor wheel 2, annular collar 48a, b and internal delimiting ring 17 which form a small gap dimension with respect to the housing 3 are heated.

Figure 4:
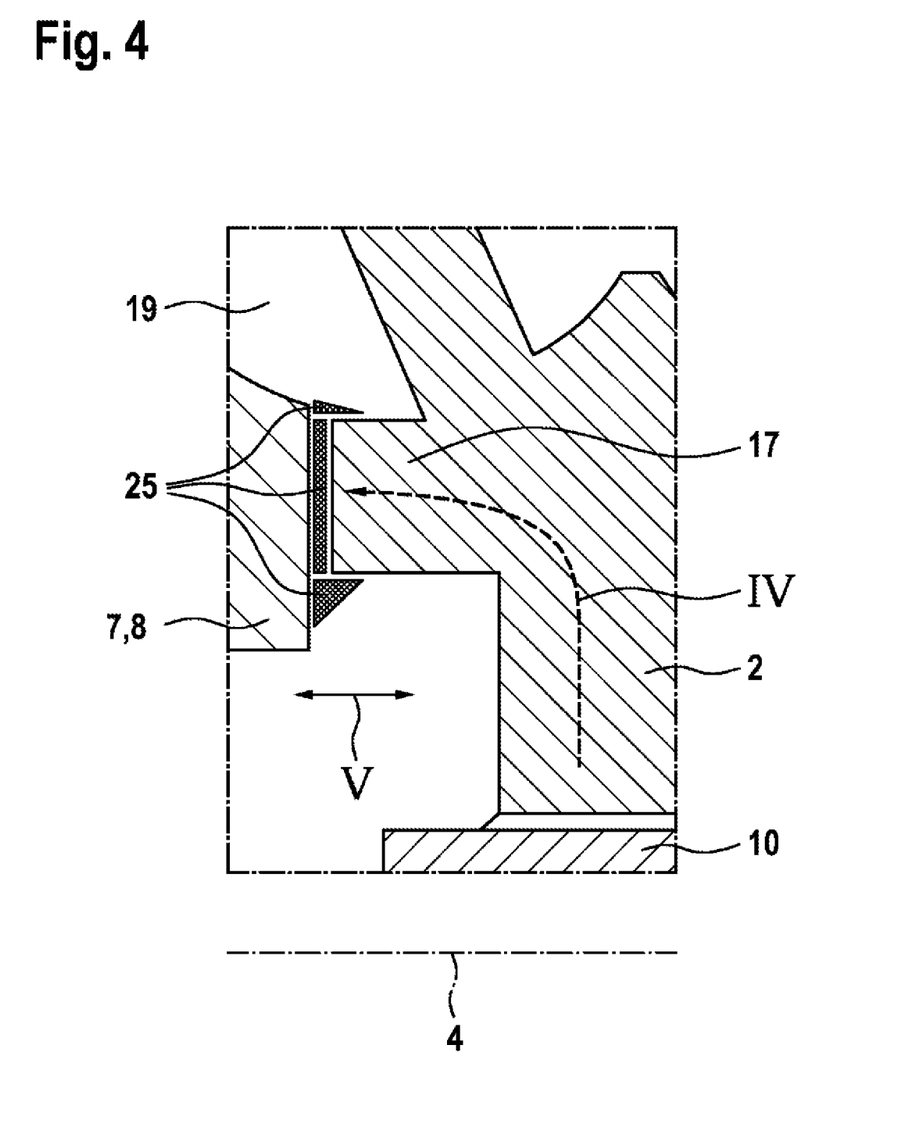
FIG. 4 is a cut-out of a compressor wheel of a housing and a rotor designated III in FIG. 3 according to the second embodiment.

FIG. 4 shows a cut-out, which is designated III in FIG. 3, of the compressor wheel 2, the housing 3 and the rotor 10 according to the second embodiment. In this instance, there is shown in particular the region of the compressor wheel 2 which faces the housing 3 and which forms a small gap dimension with respect to the housing 3. In the cut-out which is shown by way of example in FIG. 4, this is a portion of the internal delimiting ring 17 which faces the housing 3 axially with respect to the rotation axis 4, but it may also be the at least one external annular collar 48 which may face the housing 3 axially and/or radially with respect to the rotation axis.

When the side channel compressor 1 and/or the vehicle is switched off and/or stopped, the effect may occur that, in the regions between the compressor wheel 2 and the housing 3 which form a small gap dimension, fluid from the medium of the side channel compressor 1 which is intended to be conveyed accumulates. This fluid may in particular be water. The fluid accumulates as a result of capillary effects in particular in the regions with a small gap dimension between the compressor wheel 2 and the housing 3. Using the capillary effect and/or a so-called capillarity fluid accumulates on contact with gaps or hollow spaces in these regions, particularly when they have a small spacing from each other. These effects are brought about by the surface tension of fluids themselves and the interface tension between fluids and the solid surface. As a result of low ambient temperatures, this fluid can now cool in such a manner that an at least partial transition of the aggregation state from fluid to solid takes place. In the example, in which the fluid is water, water crystals and so-called ice bridges 25 can be formed between the components. These ice bridges 25 may lead to a rotation of the compressor wheel 2 in the housing 3 being prevented since, as a result of the ice bridges 25, a retention of the compressor wheel 2 in the housing 3 is brought about. This may lead to a total failure of the side channel compressor 2 and consequently the fuel cell system, whereby, for example, a fuel cell vehicle could no longer be started. Furthermore, if the compressor wheel breaks free without the ice bridges 25 melting beforehand, ice crystals could break off and reach the downstream components of the fuel cell system, wherein the ice crystals as a result of their surface structure could damage these components.

In order to prevent this damage, and in order to ensure a rotation of the compressor wheel 2 at low temperatures, a method for melting the ice bridges 25 is proposed. In this instance, the ice bridges 25 are acted on with thermal energy and change to a fluid aggregation state. In order to achieve this, a method for starting, in particular cold-starting and/or switching off the side channel compressor, is proposed. In this method, such power is supplied to the stator 12 without a rotary field between the stator 12 and the rotor 10 being formed and consequently no or a very small rotational movement of the rotor 10 about the rotation axis 4 being produced. Almost all the electrical energy which is introduced into the stator 12 is transmitted into the rotor 10, in particular the permanent magnet 10, by means of magnetic induction, wherein this energy is, however, only converted to a small degree into kinetic energy for accelerating the rotor 10 and/or the compressor wheel 2 and to produce a rotational movement of the rotor 10 and/or the compressor wheel 2. In this instance, the power supply of the stator 12 brings about an inductive heating of the rotor 10, wherein a transfer of thermal energy from the rotor 10 to the compressor wheel 2 is carried out and wherein the heat from the rotor 10 spreads in a flow direction IV into the region of the axial ends of the internal delimiting ring 17 and the at least one external annular collar 48 of the compressor wheel 2. A large portion of the electrical energy which is introduced into the stator 12 is consequently converted into thermal energy and serves to heat the rotor 10.

The compressor wheel 2 can thereby be caused to move in rotation again. The fluid which is produced in the side channel compressor 2 after the ice bridges 25 have melted can now be discharged, for example, by means of a purge valve and/or drain valve which is provided in the fuel cell system. In this manner, the service-life of the side channel compressor 1 and/or the fuel cell system can be increased.

Furthermore, as a result of the advantageous embodiment of the side channel compressor 1, a method is proposed in which the ice bridges 25 can be prevented and/or destroyed as a result of mechanical forces. In this method, the stator 12 is supplied with electrical power, whereby the axial force 21 on the rotor 10 is brought about in the direction of the rotation axis 4. By the rotor 10 and, with the rotor 10, the compressor wheel 2 moving in the direction of the rotation axis 4, wherein, by varying and/or reversing the electrical power supply, a shaking movement V is brought about during which the gap dimensions between the compressor wheel 2 and the housing 3 in the context of the shaking movement V of the rotor 10 and the compressor wheel 2 increase and decrease. Consequently, as a result of the shaking movement V of the rotor 10, a changing increase and decrease of the spacing which extends in the direction of the rotation axis 4 between the compressor wheel 2 and the housing upper portion 7 and/or the housing lower portion 8 is brought abut, in particular in the region of the axial ends of the internal delimiting ring 17 and the at least one external annular collar 48 of the compressor wheel 2. As a result of this shaking movement V and spacing change of the compressor wheel 2 with respect to the housing upper portion 7 and/or the housing lower portion 8, the ice bridges 25 which have formed radially and axially on the internal delimiting ring 17 and which are in contact with the housing upper portion 7 and/or the housing lower portion 8 are destroyed, as shown in FIG. 4. Furthermore, as a result of this shaking movement V and spacing change of the compressor wheel 2 with respect to the housing upper portion 7 and/or the housing lower portion 8, the ice bridges 25 which have formed radially and axially on the at least one annular collar 48 and which are in contact with the housing upper portion 7 and/or the housing lower portion 8 are destroyed.

The invention is not limited to the embodiments described herein and the aspects highlighted therein. Instead, within the scope set out by the claims, a large number of modifications which are within the scope of activities of the person skilled in the art are possible.

What is claimed is:

1. A side channel compressor (1) for a fuel cell system for conveying and/or compressing a gas, the side channel compressor (1) having a housing (3) and a drive (6), wherein the housing (3) has a housing upper portion (7) and a housing lower portion (8), having a compressor chamber (30) which extends in the housing (3) circumferentially around a rotation axis (4) and which has at least one circumferential side channel (19), having a compressor wheel which is located in the housing (3), which is arranged so as to be able to rotate about the rotation axis (4) and which is driven by the drive (6), wherein the compressor wheel (2) has on a circumference thereof blades (5) which are arranged in a region of the compressor chamber, and having in each case a gas inlet opening (14) and a gas outlet opening (16) which are formed in the housing (3) and which are connected to each other in fluid terms by the compressor chamber (30), characterized in that the drive (6) is an axial field electric motor (6), which has a stator (12) and a rotor (10), wherein the stator (12) and the rotor (10) extend in a disk-like manner around the rotation axis (4), wherein the stator (12) is arranged in a direction of the rotation axis (4) beside the rotor (10), wherein the rotor (10) has a cylindrical attachment (29) which extends in the direction of the rotation axis (4), wherein the cylindrical attachment (29) is arranged at a side of the rotor (10) facing away from the stator (12) and wherein a covering face of an outer diameter of the cylindrical attachment (29) extends circumferentially around the rotation axis (4), wherein the cylindrical attachment (29) at an inner diameter thereof is in contact with an outer diameter of a bearing (27), wherein the cylindrical attachment (29) at the outer diameter thereof is in contact with an inner diameter of the compressor wheel (2), and wherein the contact of the cylindrical attachment (29) with the bearing (27) and with the compressor wheel (2) is an interference fit.

2. The side channel compressor (1) as claimed in claim 1, characterized in that an air gap (9) which extends in a disk-like manner around the rotation axis (4) is formed between the stator (12) and the rotor (10) in such a manner that the air gap (9) is delimited in only one direction of the rotation axis (4) by the stator (12) and in an other direction of the rotation axis (4) by the rotor (10).

3. The side channel compressor (1) as claimed in claim 1, characterized in that the rotor (10) is arranged axially with respect to the rotation axis (4) beside the compressor wheel (2).

4. The side channel compressor (1) as claimed in claim 1, characterized in that the compressor wheel (2) forms in the region of the compressor chamber (30) between two adjacent blades (5) in each case a conveyor cell (28) which is delimited radially outward with respect to the rotation axis (4) by an external circumferential delimiting ring (11) and inward by an internal circumferential delimiting ring (17), wherein the conveyor cell (28) has at least one opening in the direction of the rotation axis (4), wherein the external delimiting ring (11) and the internal delimiting ring (17) extend in each case in a rotationally symmetrical manner with respect to the rotation axis (4).

5. The side channel compressor (1) as claimed in claim 1, characterized in that the housing lower portion (8) has a cylindrical bearing pin (36), wherein the bearing pin (36) extends in such a manner in the direction of the rotation axis (4) that the covering face thereof extends circumferentially around the rotation axis (4) and wherein the bearing (27) is in contact with an inner diameter thereof with the covering face of the bearing pin (36) radially with respect to the rotation axis (4).

6. The side channel compressor (1) as claimed in claim 1, characterized in that the rotor (10) is arranged radially with respect to the rotation axis (4) within a region of the inner diameter of the compressor wheel (2) so that an axis of symmetry (22) of the rotor (10) extends virtually in a congruent manner with an axis of symmetry (22) of the compressor wheel (2) and wherein the rotor (10) is in contact with an outer diameter of a bearing (27) and an inner diameter of the compressor wheel (2), wherein the rotor (10) forms in a joint region (23) which extends axially with respect to the rotation axis (4) the joint region (23) being a contact region between the rotor (10) and the compressor wheel (2).

7. The side channel compressor (1) as claimed in claim 1, characterized in that the stator (12) is at least partially surrounded by a pot-like sealing element (18), and wherein the pot-like sealing element (18) brings about an encapsulation of electrical components of the side channel compressor (1) by a medium of the compressor chamber (30).

8. The side channel compressor (1) as claimed in claim 5, characterized in that the compressor wheel (2) has an internal delimiting ring (17) which extends around the rotation axis (4), wherein the internal delimiting ring (17) is formed on the inner diameter of the compressor chamber (30) on the compressor wheel (2), and brings about a separation and/or encapsulation of the compressor chamber (30) from an inner region (32) of the side channel compressor (1).

9. The side channel compressor (1) as claimed in claim 4, characterized in that the compressor wheel (2) has, in a region of the external circumferential delimiting ring (11), at least one external circumferential annular collar (48a, b), wherein the at least one circumferential annular collar (48a, b) extends at a side of the external circumferential delimiting ring (11) facing away from the rotation axis (4).

10. A method for starting and/or switching off the side channel compressor (1) as claimed in claim 1, characterized in that power is supplied to the stator (12) without a rotary field being formed between the stator (12) and the rotor (10) and consequently no or a very small rotational movement of the rotor (10) about the rotation axis (4) is produced.

11. The method as claimed in claim 10, characterized in that power supply of the stator (12) brings about an inductive heating of the rotor (10), wherein a transfer of thermal energy from the rotor (10) to the compressor wheel (2) is carried out and wherein heat from the rotor (10) spreads in a flow direction (IV) into a region of axial ends of the internal circumferential delimiting ring (17) and at least one external annular collar (48) of the compressor wheel (2).

12. The method as claimed in claim 10, characterized in that an application of power to the stator (12) brings about anaxial force (21) on the rotor (10) in the direction of the rotation axis (4), whereby the rotor (10) moves in the direction of the rotation axis (4), wherein a shaking movement (V) is brought about as a result of a variation and/or reversal of an electrical power supply.

13. The method as claimed in claim 12, characterized in that the shaking movement (V) of the rotor (10) brings about a changing increase and decrease of a spacing which extends in the direction of the rotation axis (4) between the compressor wheel (2) and the housing upper portion (7) and/or the housing lower portion (8).

14. The side channel compressor (1) as claimed in claim 1, characterized in that the gas inlet opening (14) and the gas outlet opening (16) are connected to each other in fluid terms by the at least one circumferential side channel (19).

15. The side channel compressor (1) as claimed in claim 1, characterized in that the rotor (10) is arranged axially with respect to the rotation axis (4) beside the compressor wheel (2), on a hub disk (13) of the compressor wheel (2), wherein the rotor (10) is connected in a non-positive-locking and/or positive-locking and/or materially engaging manner to the compressor wheel (2).

16. The side channel compressor (1) as claimed in claim 1, characterized in that the stator (12) is at least partially surrounded by a pot-like sealing element (18), wherein the pot-like sealing element (18) is constructed as a plastic overmolding (18) of the stator (12), and wherein the pot-like sealing element (18) brings about an encapsulation of the stator (12) by the medium of the compressor chamber (30), which is hydrogen.

17. The side channel compressor (1) as claimed in claim 4, characterized in that the compressor wheel (2) has, in a region of the external circumferential delimiting ring (11), at least one external circumferential annular collar (48a, b) which extends radially with respect to the rotation axis (4), wherein the at least one circumferential annular collar (48a, b) extends at a side of the external circumferential delimiting ring (11) facing away from the rotation axis (4).

18. The method as claimed in claim 12, characterized in that the shaking movement (V) of the rotor (10) brings about a changing increase and decrease of a spacing which extends in the direction of the rotation axis (4) between the compressor wheel (2) and the housing upper portion (7) and/or the housing lower portion (8) in a region of axial ends of the internal circumferential delimiting ring (17) and at least one external annular collar (48) of the compressor wheel (2).

19. A method for starting and/or switching off the side channel compressor (1), the side channel compressor (1) for a fuel cell system for conveying and/or compressing a gas, the side channel compressor (1) having a housing (3) and a drive (6), wherein the housing (3) has a housing upper portion (7) and a housing lower portion (8), having a compressor chamber (30) which extends in the housing (3) circumferentially around a rotation axis (4) and which has at least one circumferential side channel (19), having a compressor wheel which is located in the housing (3), which is arranged so as to be able to rotate about the rotation axis (4) and which is driven by the drive (6), wherein the compressor wheel (2) has on a circumference thereof blades (5) which are arranged in a region of the compressor chamber, and having in each case a gas inlet opening (14) and a gas outlet opening (16) which are formed in the housing (3) and which are connected to each other in fluid terms by the compressor chamber (30), characterized in that the drive (6) is an axial field electric motor (6), which has a stator (12) and a rotor (10),
    wherein the stator (12) and the rotor (10) extend in a disk-like manner around the rotation axis (4), and wherein the stator (12) is arranged in a direction of the rotation axis (4) beside the rotor (10),
    wherein power is supplied to the stator (12) without a rotary field being formed between the stator (12) and the rotor (10) and consequently no or a very small rotational movement of the rotor (10) about the rotation axis (4) is produced,
    wherein an application of power to the stator (12) brings about anaxial force (21) on the rotor (10) in the direction of the rotation axis (4), whereby the rotor (10) moves in the direction of the rotation axis (4),
    wherein a shaking movement (V) is brought about as a result of a variation and/or reversal of an electrical power supply, and
    wherein the shaking movement (V) of the rotor (10) brings about a changing increase and decrease of a spacing which extends in the direction of the rotation axis (4) between the compressor wheel (2) and the housing upper portion (7) and/or the housing lower portion (8).

20. The method as claimed in claim 19, wherein the shaking movement (V) occurs in a region of axial ends of the internal circumferential delimiting ring (17) and at least one external annular collar (48) of the compressor wheel (2).

* * * * *